(12) United States Patent
Ikezoe et al.

(10) Patent No.: US 12,280,686 B2
(45) Date of Patent: Apr. 22, 2025

(54) CHARGE-DISCHARGE CONTROL SYSTEM AND CHARGE-DISCHARGE CONTROL METHOD

(71) Applicants: NISSAN MOTOR CO., LTD., Yokohama (JP); RENAULT s.a.s., Boulogne-Billancourt (FR)

(72) Inventors: Keigo Ikezoe, Kanagawa (JP); Kenta Suzuki, Kanagawa (JP); Kensuke Murai, Kanagawa (JP)

(73) Assignees: NISSAN MOTOR CO., LTD., Yokohama (JP); RENAULT S.A.S., Boulogne-Billancourt (FR)

( * ) Notice: Subject to any disclaimer, the term of this patent is extended or adjusted under 35 U.S.C. 154(b) by 0 days.

(21) Appl. No.: 18/276,577

(22) PCT Filed: Feb. 10, 2021

(86) PCT No.: PCT/IB2021/000084
§ 371 (c)(1),
(2) Date: Aug. 9, 2023

(87) PCT Pub. No.: WO2022/172046
PCT Pub. Date: Aug. 18, 2022

(65) Prior Publication Data
US 2024/0116378 A1    Apr. 11, 2024

(51) Int. Cl.
*H02J 7/00* (2006.01)
*B60L 53/30* (2019.01)
(Continued)

(52) U.S. Cl.
CPC .............. *B60L 53/30* (2019.02); *B60L 53/67* (2019.02); *B60L 53/68* (2019.02); *H01M 10/44* (2013.01);
(Continued)

(58) Field of Classification Search
CPC .... B60L 53/30; B60L 53/6768; H02J 7/00045
(Continued)

(56) References Cited

U.S. PATENT DOCUMENTS 6,975,997 B1 * 12/2005 Murakami ............. G06Q 10/02
705/5
9,571,162 B2   2/2017 Masaoka
(Continued)

FOREIGN PATENT DOCUMENTS

CN    202167083 U    3/2012
CN    103828188 A    5/2014
(Continued)

OTHER PUBLICATIONS

U.S. Appl. No. 18/276,560, filed Aug. 9, 2023, Nissan Motor Co., Ltd.; Renault S.A.S.
(Continued)

*Primary Examiner* — Alexis B Pacheco
(74) *Attorney, Agent, or Firm* — Foley & Lardner LLP

(57) ABSTRACT

A charge-discharge control system is provided in which each of a plurality of charge-discharge elements autonomously controls charging-discharging. The charge-discharge control system includes an external control device that broadcasts a control signal to the charge-discharge elements that perform charging-discharging; and an authentication device that permits charging-discharging of each of the charge-discharge elements. The charge-discharge elements having received the control signal transmit, to the authentication device, a permission request signal, which is based on the received control signal. The authentication device having received the permission request signal determines whether the permission request signal is a permission request signal based on the control signal received by the charge-discharge elements, and the authentication device connects a power
(Continued)

line for performing charging-discharging to the charge-discharge elements if the authentication device determines that the permission request signal is the permission request signal based on the control signal received by the charge-discharge elements.

6 Claims, 11 Drawing Sheets

(51) Int. Cl.
*B60L 53/67* (2019.01)
*B60L 53/68* (2019.01)
*H01M 10/44* (2006.01)
*H02J 7/14* (2006.01)

(52) U.S. Cl.
CPC ..... *H02J 7/00045* (2020.01); *H01M 2220/20* (2013.01)

(58) Field of Classification Search
USPC .......................................................... 320/106
See application file for complete search history.

(56) References Cited

U.S. PATENT DOCUMENTS

| | | | |
|---|---|---|---|
| 11,069,927 B2 | 7/2021 | Yokoyama et al. | |
| 2009/0085522 A1* | 4/2009 | Matsumoto | B60L 53/60 320/137 |
| 2010/0001687 A1* | 1/2010 | Watanabe | B60L 3/12 320/109 |
| 2010/0010698 A1* | 1/2010 | Iwashita | B60L 53/665 340/5.2 |
| 2010/0141203 A1* | 6/2010 | Graziano | B60L 53/18 320/109 |
| 2010/0235026 A1* | 9/2010 | Shimizu | B60R 25/25 180/65.265 |
| 2011/0031929 A1* | 2/2011 | Asada | H02J 7/0013 320/109 |
| 2011/0057613 A1* | 3/2011 | Taguchi | B60L 53/65 320/109 |
| 2011/0187321 A1* | 8/2011 | Hirayama | H02J 50/80 320/108 |
| 2011/0241647 A1 | 10/2011 | Hershey et al. | |
| 2012/0007554 A1* | 1/2012 | Kanamori | H01M 10/44 320/109 |
| 2013/0119947 A1 | 5/2013 | Ishida et al. | |
| 2013/0198551 A1 | 8/2013 | Marlin et al. | |
| 2015/0357854 A1 | 12/2015 | Watanabe | |
| 2016/0274607 A1 | 9/2016 | Kudo et al. | |
| 2017/0010595 A1 | 1/2017 | Kawaguchi | |
| 2017/0018923 A1 | 1/2017 | Rombouts | |
| 2018/0058085 A1* | 3/2018 | Katanoda | B60L 53/38 |
| 2021/0170903 A1* | 6/2021 | Tsuchiya | B60L 53/60 |

FOREIGN PATENT DOCUMENTS

| | | |
|---|---|---|
| CN | 106740240 A | 5/2017 |
| JP | 2009-112148 A | 5/2009 |
| JP | 2011-217600 A | 10/2011 |
| JP | 2012-039685 A | 2/2012 |
| JP | 2012-152036 A | 8/2012 |
| JP | 2012-257436 A | 12/2012 |
| JP | 2013-172537 A | 9/2013 |
| JP | 2014-090586 A | 5/2014 |
| JP | 5598896 B2 | 10/2014 |
| JP | 2015-057936 A | 3/2015 |
| JP | 2016-015875 A | 1/2016 |
| JP | 6168528 B2 | 7/2017 |
| JP | 2017-158363 A | 9/2017 |
| JP | 2018-064458 A | 4/2018 |
| JP | 2018-160821 A | 10/2018 |
| WO | WO-2020/194010 A1 | 10/2020 |

OTHER PUBLICATIONS

U.S. Appl. No. 18/276,602, filed Aug. 9, 2023, Nissan Motor Co., Ltd.; Renault S.A.S.
U.S. Appl. No. 18/276,614, filed Aug. 9, 2023, Nissan Motor Co., Ltd.; Renault S.A.S.
Research on Energy-Saving and Security Protocols for Wireless Sensor Networks (provided as evidence of common knowledge), Apr. 2013.
Military Network and Communication Security Technology (provided as evidence of common knowledge), Jan. 2018.

* cited by examiner

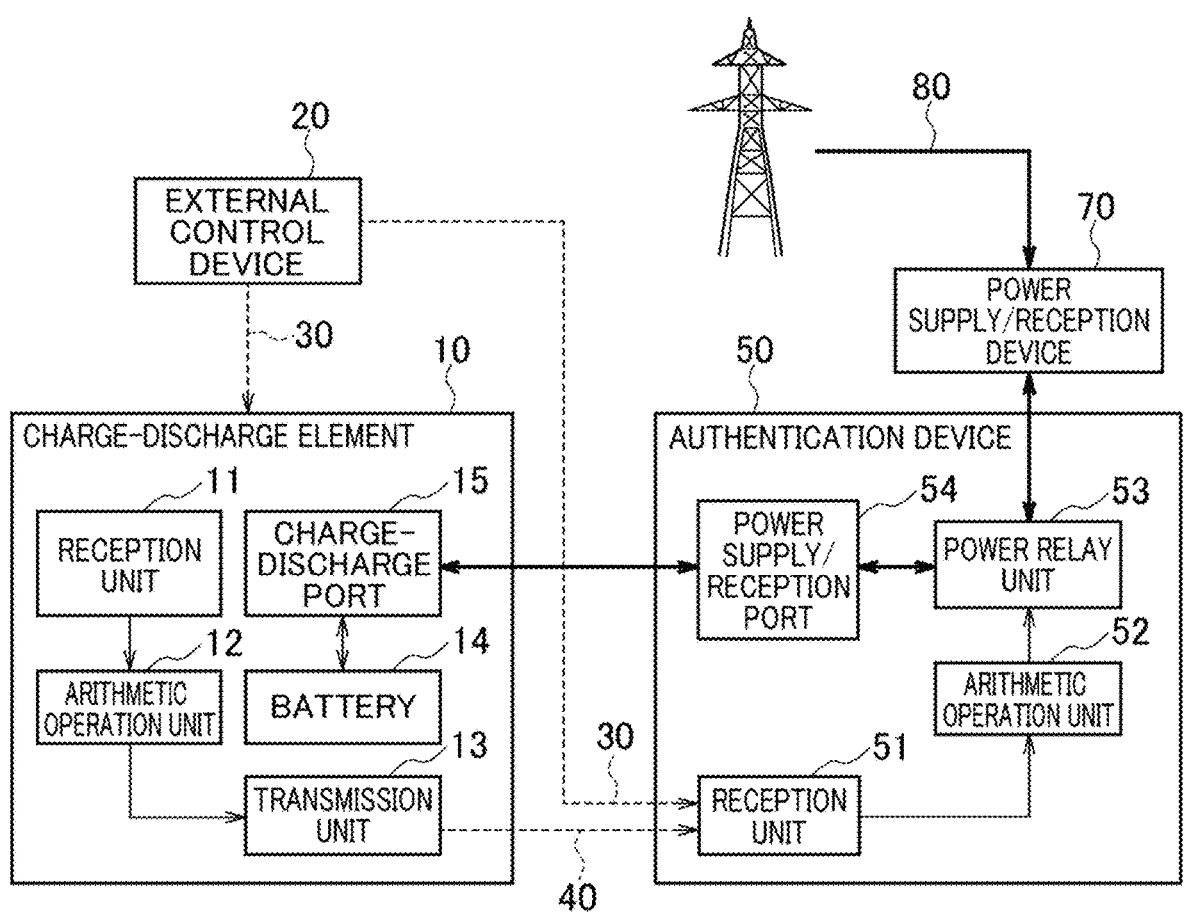

CHARGE-DISCHARGE CONTROL SYSTEM AND CHARGE-DISCHARGE CONTROL METHOD

TECHNICAL FIELD

The present invention relates to a charge-discharge control system and a charge-discharge control method.

BACKGROUND ART

There has been disclosed an authentication system for preventing unauthorized use of a charging facility for charging an EV (Patent Literature 1). In the authentication system disclosed in Patent Literature 1, an authentication server generates service connection information in response to a request from vehicle-mounted communication equipment, transmits the service connection information to the vehicle-mounted communication equipment and service providing equipment (charging facility), and further transmits information necessary for authentication to the vehicle-mounted communication equipment. The vehicle-mounted communication equipment transmits the acquired service connection information and information necessary for authentication to the service providing equipment, and the service providing equipment transmits the received information necessary for authentication to the authentication server, and receives the result of verifying the validity of the information necessary for authentication from the authentication server. This prevents unauthorized use of the charging facility.

CITATION LIST

Patent Literature

[Patent Literature 1] Japanese Unexamined Patent Application Publication No. 2018-160821

SUMMARY OF THE INVENTION

Problems to be Solved by the Invention

However, in the authentication system disclosed in Patent Literature 1, mutual communication is required both between the vehicle-mounted equipment and the authentication server, and between the service providing equipment and the authentication server. Further, the authentication server needs to, collectively, generate service information in response to a request transmitted from each piece of vehicle-mounted equipment, and verify the validity of the information necessary for authentication transmitted from the service providing equipment. Therefore, the processing load of the authentication server increases as the number of pieces of corresponding vehicle-mounted equipment increases, and more cost is required. In addition, the communication cost and the cost for cybersecurity increase if mutual communication is performed both between the vehicle-mounted equipment and the authentication server and between the service providing equipment and the authentication server.

The present invention has been devised in consideration of the above problems, and an object of the present invention is to provide a charge-discharge control system and a charge-discharge control method that can reduce the cost of authentication when performing charging-discharging while preventing unauthorized use of a charge-discharge facility.

Means for Solving the Problem

A charge-discharge control system according to an aspect of the present invention is a charge-discharge control system in which each of a plurality of charge-discharge elements autonomously controls charging-discharging, and the charge-discharge control system includes: an external control device that broadcasts a control signal to the charge-discharge elements that perform charging-discharging; and an authentication device that permits charging-discharging of each of the charge-discharge elements. The charge-discharge elements having received the control signal transmit, to the authentication device, a permission request signal for requesting permission for charging-discharging, which is based on the received control signal. The authentication device having received the permission request signal determines whether the permission request signal is a permission request signal based on the control signal received by the charge-discharge elements, and the authentication device connects a power line for performing charging-discharging to the charge-discharge elements if the authentication device determines that the permission request signal is the permission request signal based on the control signal received by the charge-discharge elements.

Advantageous Effect of the Invention

According to an aspect of the present invention, it is possible to reduce the cost of authentication when performing charging-discharging while preventing unauthorized use of a charge-discharge facility.

BRIEF DESCRIPTION OF THE DRAWINGS

FIG. 4 is a block diagram showing the configuration of a charge-discharge control system according to a second embodiment.

MODES FOR CARRYING OUT THE INVENTION

Figure 1:
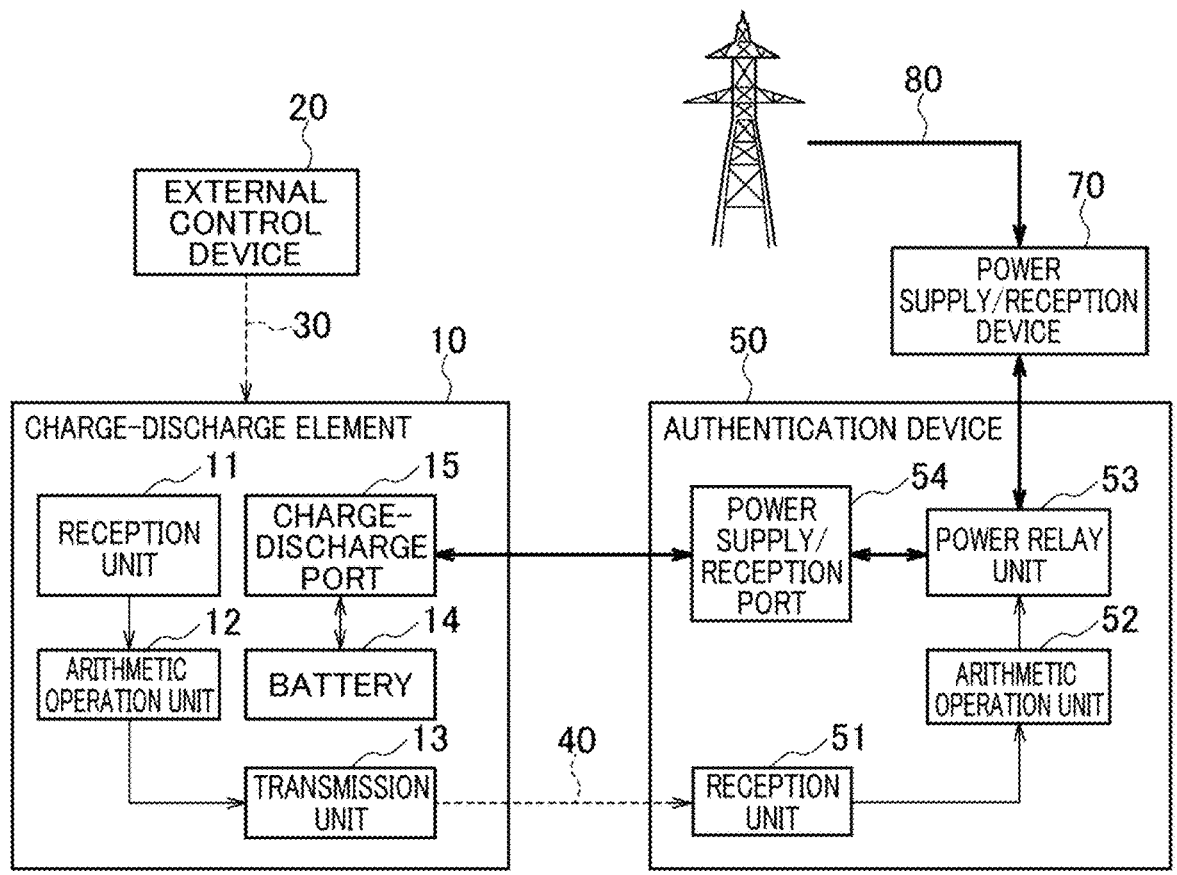
FIG. 1 is a block diagram showing the configuration of a charge-discharge control system according to a first embodiment.

Embodiments will be described with reference to the accompanying drawings. In the illustration of the drawings, the same parts are denoted with the same reference numerals, and therefore the description thereof is omitted. The charge-discharge control system in the present invention is a charge-discharge control system in which each charge-discharge element autonomously controls charging-discharging, and in the embodiments herein, a description will be given regarding a charge-discharge control system in which each charge-discharge element is assumed to be an EV.

First Embodiment

[Configuration of Charge-Discharge Control System]

Figure 2:
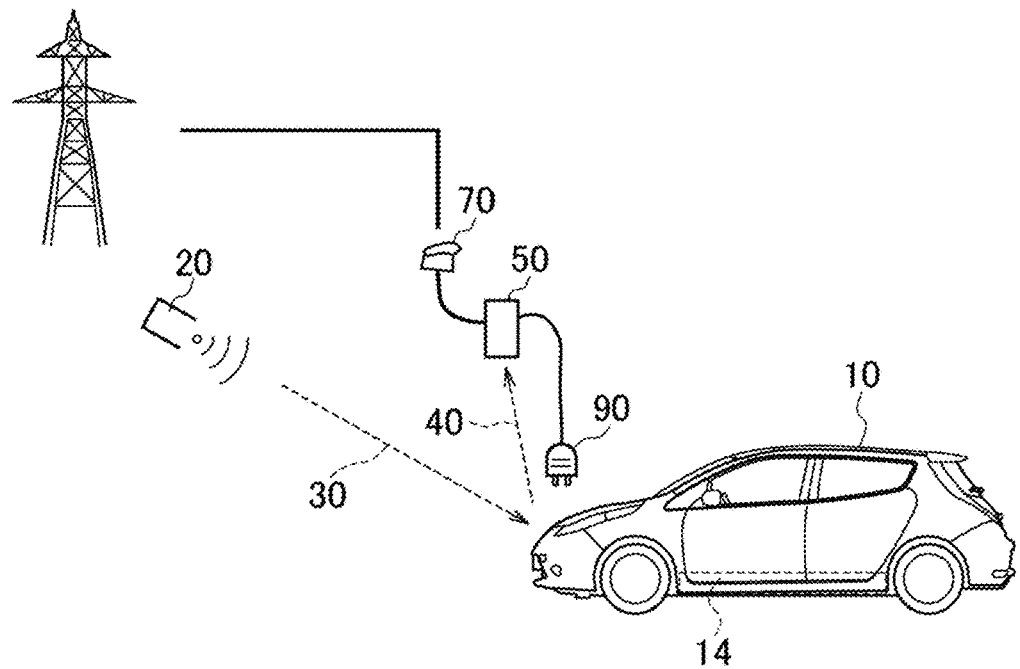
FIG. 2 is a schematic diagram showing the configuration of the charge-discharge control system according to the first embodiment.

The configuration of a charge-discharge control system according to a first embodiment will be described with reference to FIGS. 1 and 2. The charge-discharge control system includes an EV 10 (an example of a charge-discharge element), an external control device 20, an authentication device 50, and a power supply/reception device 70.

The EV 10 supplies power to an electric motor (not shown) from a battery 14 in the EV 10 and travels with the electric motor as a motive power source. If the amount of charged power of the battery 14 decreases due to travelling and discharging (V2H: vehicle to home, V2B: vehicle to building, V2G: vehicle to grid), the EV 10 receives power from the power supply/reception device 70 via the authentication device 50 and charges the battery 14.

When the battery 14 of the EV 10 is charged, the EV 10 receives a control signal 30 from the external control device 20 and transmits, to the authentication device 50, a permission request signal 40 for requesting permission for charging-discharging, which is based on the received control signal 30. If the permission request signal 40 transmitted to the authentication device 50 is authenticated by the authentication device 50, the EV 10 can perform charging-discharging. The EV 10 controls the charge-discharge power when performing charging-discharging based on the received control signal 30.

The definition of the EV 10 in the present embodiment is not limited to a vehicle using only an electric motor as a motive power source, but includes all vehicles such as plug-in hybrid vehicles that charge their batteries by receiving power from power supply/reception devices 70 installed outside the vehicles.

The external control device 20 is installed at a position where the EV 10 that performs charging-discharging can receive the control signal 30 transmitted from the external control device 20. The external control device 20 is installed above the position where the EV 10 stops to connect with the power supply/reception device 70, for example. The external control device 20 acquires the total power usable by a plurality of EVs 10 that perform charging-discharging, from a power infrastructure that supplies power, through a communication line such as an Internet line, and broadcasts the control signal 30 including the total power usable for charging to the EVs 10 that perform charging-discharging, by means of wireless communication. The control signal 30 transmitted by the external control device 20 is a signal for each of the EVs 10 that perform charging-discharging to autonomously control charging-discharging.

The external control device 20 may receive the total power usable for charging by the EVs 10 that perform charging-discharging, from an aggregator (not shown) that maintains the balance between power supply and demand by controlling all power demand, including the total power usable by the EVs 10 that perform charging-discharging. Alternatively, the external control device 20 may obtain the total power that can be supplied at present and the total power consumed at present from the power infrastructure and calculate the total power usable for charging by the EVs that perform charging-discharging.

The authentication device 50 is installed at a power line for the EV 10 to perform charging-discharging, which extends from the power supply/reception device 70 and connects the power supply/reception device 70 and the EV 10. The authentication device 50 disconnects the power line connecting the power supply/reception device 70 and the EV 10 by disconnecting a power relay unit 53.

The authentication device 50 receives the permission request signal 40 for requesting permission for charging-discharging, transmitted from the EV 10, and determines whether the received permission request signal 40 is a permission request signal 40 based on the control signal 30 received by the EV 10. If the authentication device 50 determines that the received control signal 30 is the permission request signal 40 based on the control signal 30 received by the EV 10, the authentication device 50 connects the power line for performing charging-discharging to the EV 10.

The power supply/reception device 70 is a pole or wall-mounted transformer and is connected to a transmission line 80 from the power infrastructure. The power supply/reception device 70 supplies power to the EV 10 and receives power from the EV 10.

[Configuration of EV 10]

The configuration of the EV 10 will be described specifically.

The EV 10 has a reception unit 11, an arithmetic operation unit 12, a transmission unit 13, the battery 14, and a charge-discharge port 15.

The reception unit 11 includes a receiver for receiving the control signal 30 broadcast from the external control device 20 by means of wireless communication, and transfers the received control signal 30 to the arithmetic operation unit 12. For the wireless communication, a wireless local area network (LAN) such as Wi-Fi (registered trademark), or Bluetooth (registered trademark) can be used.

The transmission unit 13 includes a transmitter for transmitting the permission request signal 40 output by the arithmetic operation unit 12, to the authentication device 50 by means of wireless communication, and transmits the permission request signal 40 to the authentication device 50.

The battery 14 stores power for driving the electric motor and power to be discharged (V2H, V2B, and V2G) and used.

The charge-discharge port 15 is a charge-discharge opening into which a connector 90 of the power line extending from the power supply/reception device 70 is to be inserted. The charge-discharge port 15 is connected to the battery 14 by using a power line.

The arithmetic operation unit 12 is a general-purpose microcomputer having a CPU (a central processing unit), a memory, and an input/output unit. A computer program for causing the microcomputer to function as the arithmetic operation unit 12 is installed in the microcomputer. By executing the computer program, the microcomputer functions as a plurality of information processing circuits of the arithmetic operation unit 12. While the present embodiment shows an example of realizing the plurality of information processing circuits of the arithmetic operation unit 12 by software, it is also possible to configure each information processing circuit by preparing dedicated hardware for performing each item of information processing shown below. Further, the plurality of information processing circuits may be configured by individual pieces of hardware.

The arithmetic operation unit 12 outputs the permission request signal 40 to be transmitted to the authentication device 50, calculates the charge-discharge power when the EV 10 performs charging-discharging, and controls the charge-discharge power of the EV 10.

If the EV 10 performs charging-discharging, the arithmetic operation unit 12 outputs, to the authentication device 50, the permission request signal 40 for requesting permission for charging-discharging. Specifically, if the arithmetic operation unit 12 determines that the connector number of the connector 90 of the power line extending from the power supply/reception device 70 is acquired and that the connector 90 is connected to the charge-discharge port 15 of the EV 10, the arithmetic operation unit 12 starts receiving the control signal 30. If the arithmetic operation unit 12 receives the control signal 30, the arithmetic operation unit 12 outputs, as the permission request signal 40, a signal for proving that the control signal 30 has been received, which is set in advance with the authentication device 50.

When the EV 10 starts performing charging-discharging, the arithmetic operation unit 12 counts the time from when charging-discharging has started, and if the charge-discharge power amount of the battery 14 is less than a threshold charge-discharge power amount, the arithmetic operation unit 12 outputs the permission request signal 40 each time a first threshold time has passed from when charging-discharging has started. If the charge-discharge power amount of the battery 14 when the first threshold time has passed is equal to or greater than the threshold charge-discharge power amount, the arithmetic operation unit 12 determines that charging-discharging has been completed and does not output the permission request signal 40. As a result, receiving of power from the power supply/reception device 70 and supplying power to the power supply/reception device 70 are stopped, and charging-discharging of the EV 10 ends.

The threshold charge-discharge power amount is the amount of power for charging-discharging set by the user of the EV 10 based on the amount of charged power of the battery 14. The charge-discharge power amount may be set according to the state of charge (SOC). The first threshold time varies depending on the charging method of the power supply/reception device 70. If the power supply/reception device 70 performs normal charging (3 to 6 kW), the first threshold time is set at 30 minutes, for example. If the power supply/reception device 70 performs rapid charging (20 to 100 kW), the first threshold time is set at 1 minute. If the charge-discharge power amount of the battery 14 is less than the threshold charge-discharge power amount, the EV 10 can continue performing charging-discharging by outputting the permission request signal 40 each time the first threshold time has passed from when charging-discharging has started.

The arithmetic operation unit 12 can determine whether the EV 10 performs charging-discharging by determining whether the connector number has been acquired. By acquiring the connector number, the arithmetic operation unit 12 can transmit the permission request signal 40 to the authentication device 50 connected to the power supply/reception device 70 which is used by the EV 10 for performing charging-discharging. This can prevent interference with a permission request signal 40 transmitted by another EV 10.

The connector number may be acquired by using the value input to the EV 10 by the user of the EV 10 or an image captured by using a camera in the EV 10.

The user of the EV 10 himself/herself may connect the connector 90 to the charge-discharge port 15, or the connector 90 may be automatically connected to the charge-discharge port 15. In the present embodiment, by the connector 90 being connected to the charge-discharge port 15 in a wired manner, the EV 10 and the power supply/reception device 70 are connected and the EV 10 performs charging-discharging, but the connection between the EV 10 and the power supply/reception device 70 may be a wireless connection for wireless charging-discharging.

If the connection between the EV 10 and the power supply/reception device 70 is a wireless connection, it is sufficient if the arithmetic operation unit 12 can confirm that a power supply/reception unit for wireless power supply equivalent to the connector 90 and a wireless charge-discharge unit equivalent to the charge-discharge port 15 are at positions where they can be electrically connected.

The permission request signal 40 set in advance with the authentication device 50 is a password set in advance between the EV 10 and the authentication device 50, and the password is a string of numbers and characters. The password is given to the user of the EV 10 by the user signing a contract to use the power supply/reception device 70, and the user registers the given password to the EV 10 and the authentication device 50. As a result, when starting charging-discharging, the arithmetic operation unit 12 can output the password set in advance with the authentication device 50 as the permission request signal 40.

The arithmetic operation unit 12 calculates charged power when the EV 10 performs charging, based on the received control signal 30. Specifically, the arithmetic operation unit 12 calculates the charged power by considering the total power usable by a plurality of EVs 10 that perform charging-discharging, the amount of power required by the EV 10 for charging, the time when the EV 10 completes charging and starts travelling, and the time required to obtain the amount of power required by the EV 10 for charging.

The arithmetic operation unit 12 calculates the discharge power when the EV 10 performs discharging. Specifically, if the arithmetic operation unit 12 determines that the supply power of the power infrastructure is insufficient based on the control signal 30, the arithmetic operation unit calculates the amount of power that can be discharged by the EV 10 according to the amount of charged power of the battery 14, and determines whether the EV 10 can perform discharging. If the arithmetic operation unit 12 determines that the EV 10 can perform discharging, the arithmetic operation unit 12 outputs a message for confirming whether discharging is permitted, and the amount of power that can be discharged when discharging is performed, to a monitor provided in the vehicle interior of the EV 10. The user of the EV 10 inputs, to the EV 10, whether to permit discharging, and the discharge power amount when discharging is permitted. If the user of the EV 10 permits discharging, the arithmetic operation unit 12 calculates the discharge power based on the discharge power amount input by the user of the EV 10. The user of the EV 10 can obtain an incentive according to the discharge power amount.

The arithmetic operation unit 12 controls the battery 14 and a control circuit provided between the charge-discharge port 15 and the battery 14 and controls the charge-discharge power to obtain the calculated charge-discharge power. The control circuit and a control method for controlling the charge-discharge power are configured by using known techniques.

[Configuration of Authentication Device 50]

The configuration of the authentication device 50 will be described specifically.

The authentication device 50 includes a reception unit 51, an arithmetic operation unit 52, a power relay unit 53, and a power supply/reception port 54.

The reception unit 51 includes a receiver that receives the permission request signal 40 transmitted from the EV 10, and transfers the received permission request signal 40 to the arithmetic operation unit 52.

The power relay unit 53 is a normally open relay, and when a control current flows due to the arithmetic operation unit 52, the power relay unit 53 turns on the switch, and connects a power line which is for connecting the power supply/reception device 70 and the EV 10 and which is for the EV 10 to perform charging-discharging.

The power supply/reception port 54 is an insertion port for connecting a power line extending from the authentication device 50 to the connector 90 to be connected to the EV 10, and power is supplied to the EV 10 and power is received from the EV 10 through the power supply/reception port 54.

The arithmetic operation unit 52 is a general-purpose microcomputer having a CPU (a central processing unit), a memory, and an input/output unit, and the hardware configuration thereof is similar to that of the arithmetic operation unit 12. While the present embodiment shows an example of realizing a plurality of information processing circuits of the arithmetic operation unit 52 by software, it is also possible to configure each information processing circuit by preparing dedicated hardware for performing each information processing shown below. Further, the plurality of information processing circuits may be configured by individual pieces of hardware.

The arithmetic operation unit 52 determines whether the received permission request signal 40 is a permission request signal 40 based on the control signal received by the EV 10. Specifically, the arithmetic operation unit 52 determines whether the received permission request signal 40 is a signal set in advance with the authentication device 50 and is a password set in advance between the EV 10 and the authentication device 50. If the arithmetic operation unit 52 determines that the received permission request signal 40 is the signal set in advance with the authentication device 50, the arithmetic operation unit 52 performs control to connect the power relay unit 53 and connects the power line for the vehicle to perform charging-discharging.

The arithmetic operation unit 52 counts the time from when charging-discharging of the EV 10 has started, and determines whether the permission request signal 40 has been received when the first threshold time has passed. A count start timing of the time from when charging-discharging has started, which is counted by the arithmetic operation unit 52, is the same as the start timing of the count performed by the arithmetic operation unit 12. If the arithmetic operation unit 52 determines that the permission request signal 40 has been received when the first threshold time has passed from when charging-discharging of the EV 10 has started, the arithmetic operation unit 52 continuously connects the power line for performing charging-discharging to the EV 10. The first threshold time is the same as the first threshold time set for the EV 10.

Considering that an error occurs in the count start timing of the time from when charging-discharging has started between the EV 10 and the authentication device 50, the arithmetic operation unit 52 may determine whether the permission request signal 40 has been received after the first threshold time has passed until a third threshold time has passed. The third threshold time is 1 second, for example.

Although the present embodiment shows an example in which the authentication device 50 is installed at the power line connecting the power supply/reception device 70 and the EV 10, the installed position of the authentication device 50 is not limited thereto. The authentication device 50 may be mounted in the power supply/reception device 70 or may be installed between the power supply/reception device 70 and the power infrastructure, for example.

[Charge-Discharge Control Method]

Figure 3:
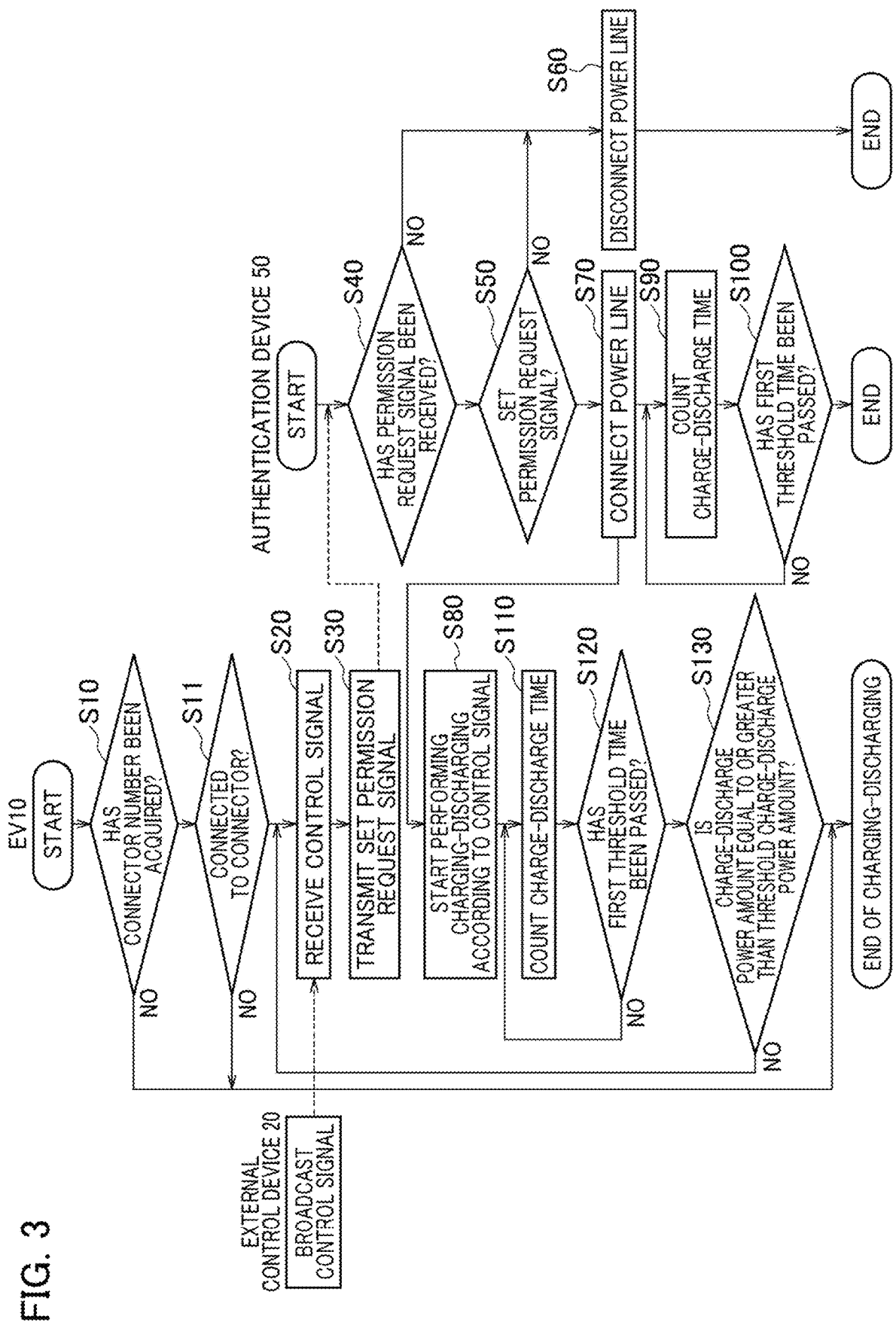
FIG. 3 is a flowchart showing the processing of the charge-discharge control system according to the first embodiment.

Next, with reference to FIG. 3, an example of processing of the charge-discharge control system shown in FIG. 1 will be described. The flowchart of FIG. 3 shows processing of each of the EV 10, the external control device 20, and the authentication device 50, and a description will be given regarding processing from when the EV 10 starts performing charging-discharging to when the EV 10 stops performing charging-discharging as the charge-discharge control system.

The processing of the EV 10 starts at the same time that a power switch of the EV 10 is turned on, and the processing ends when it is determined that the charge-discharge power amount of the battery 14 is equal to or greater than the threshold charge-discharge power amount. The external control device 20 and the authentication device 50 will continue performing processing as long as the power is turned on.

In step S10, the arithmetic operation unit 12 determines whether the connector number of the connector 90 of the power line extending from the power supply/reception device 70 has been acquired. If the arithmetic operation unit 12 determines that the connector number has not been acquired (NO in step S10), the arithmetic operation unit 12 ends the processing.

If the arithmetic operation unit 12 determines that the connector number has been acquired (YES in step S10) in step S10, the processing proceeds to step S11.

In step S11, the arithmetic operation unit 12 determines whether the connector 90 is connected to the charge-discharge port 15 of the EV 10. If the arithmetic operation unit 12 determines that the connector 90 is not connected to the charge-discharge port 15 of the EV 10 (NO in step S11), the processing ends.

If the arithmetic operation unit 12 determines in step S11 that the connector 90 is connected to the charge-discharge port 15 of the EV 10 (YES in step S11), the processing proceeds to step S20.

In step S20, the arithmetic operation unit 12 starts receiving the control signal 30 and acquires the received control signal 30.

Processing proceeds to step S30, and the arithmetic operation unit 12 transmits, to the authentication device 50, the permission request signal 40 for requesting permission for charging-discharging, which is based on the received control signal 30. Specifically, the arithmetic operation unit 12 outputs, as the permission request signal 40, a signal for proving that the control signal 30 has been received, which is set in advance with the authentication device 50.

Processing proceeds to step S40, and the arithmetic operation unit 52 determines whether the permission request signal 40 has been received. If the arithmetic operation unit 52 determines that the permission request signal 40 has not been received (NO in step S40), the processing proceeds to step S60.

If the arithmetic operation unit 52 determines that the permission request signal 40 has been received (YES in step S40) in step S40, the processing proceeds to step S50.

In step S50, the arithmetic operation unit 52 determines whether the received permission request signal 40 is the permission request signal 40 based on the control signal 30 received by the EV 10. Specifically, the arithmetic operation unit 52 determines whether the received permission request signal 40 is the signal set in advance with the authentication device 50. If the arithmetic operation unit 52 determines that the received permission request signal 40 is not the permission request signal 40 based on the control signal 30 received by the EV 10 (NO in step S50), the processing proceeds to step S60.

If the arithmetic operation unit 52 determines that the received permission request signal 40 is the permission request signal 40 based on the control signal 30 received by the EV 10 (YES in step S50) in step S50, the processing proceeds to step S70.

In step S60, the arithmetic operation unit 52 performs control to disconnect the power relay unit 53 and disconnects the power line for performing charging-discharging from the EV 10. If the power relay unit 53 is already disconnected, the arithmetic operation unit 52 maintains the disconnected state.

In step S70, the arithmetic operation unit 52 performs control to connect the power relay unit 53, and connects the power line for performing charging-discharging to the EV 10. The processing branches here, and the processing proceeds to steps S80 and S90. The processing at step S110 and thereafter of the arithmetic operation unit 12 and the processing at step S90 and thereafter of the arithmetic operation unit 52 are performed simultaneously.

Processing proceeds to step S80, and the arithmetic operation unit 12 starts performing charging-discharging. The arithmetic operation unit 12 controls the battery 14 and the control circuit and controls the charge-discharge power to obtain the charge-discharge power calculated based on the received control signal 30.

Processing proceeds to step S110, and the arithmetic operation unit 12 counts the time from when charging-discharging has started. Processing proceeds to step S120, and the arithmetic operation unit 12 determines whether the time from when charging-discharging has started has passed the first threshold time.

In step S120, if the arithmetic operation unit 12 determines that the time from when charging-discharging has started has not passed the first threshold time (NO in step S120), the processing stays in step S120 until the time from when charging-discharging has started has passed the first threshold time.

In step S120, if the arithmetic operation unit 12 determines that the time from when charging-discharging has started has passed the first threshold time (YES in step S120), the processing proceeds to step S130.

In step S130, the arithmetic operation unit 12 determines whether the charge-discharge power amount of the battery 14 is equal to or greater than the threshold charge-discharge power amount. If the arithmetic operation unit determines that the charge-discharge power amount of the battery 14 is equal to or greater than the threshold charge-discharge power amount (YES in step S130), the arithmetic operation unit 12 determines that charging-discharging of the EV 10 has been completed and ends the processing. Charging-discharging of the EV 10 is completed.

In step S130, if the arithmetic operation unit 12 determines that the charge-discharge power amount of the battery 14 is less than the threshold charge-discharge power amount (NO in step S130), the processing returns to step S20. The arithmetic operation unit 12 can transmit a permission request signal 40 for continuing performing charging-discharging by performing the processing at step S20 and thereafter again.

In step S90, the arithmetic operation unit 52 counts the time from when charging-discharging has started. Processing proceeds to step S100, and the arithmetic operation unit 52 determines whether the time from when charging-discharging has started has passed the first threshold time.

In step S100, if the arithmetic operation unit 52 determines that the time from when charging-discharging has started has not passed the first threshold time (NO in step S100), the processing stays in step S100 until the time from when charging-discharging has started has passed the first threshold time.

In step S100, if the arithmetic operation unit 52 determines that the time from when charging-discharging has started has passed the first threshold time (YES in step S100), the processing ends, and the processing from step S40 is performed again. Therefore, if the authentication device 50 receives the permission request signal 40, the authentication device 50 can continuously supply power to the EV 10 and receive power from the EV 10.

As described above, according to the first embodiment, the following operations and effects can be obtained.

When requesting permission for charging-discharging, the EV 10 receives the control signal 30 that is broadcast from the external control device 20 to the plurality of EVs 10 that perform charging-discharging, and transmits, to the authentication device 50, the permission request signal 40 for requesting permission for charging-discharging, which is based on the control signal 30. After receiving the permission request signal 40 from the EV 10, the authentication device 50 determines whether the permission request signal 40 is the permission request signal 40 based on the control signal 30 received by the EV 10. This enables the authentication device 50 to determine whether the EV 10 is following the control signal 30 transmitted from the external control device 20.

If the authentication device 50 determines that the control signal 30 received from the EV 10 is the permission request signal 40 based on the control signal 30 received by the EV 10, the authentication device 50 connects the power line for performing charging-discharging to the EV 10. This enables the power supply/reception device 70 to supply power to the EV 10 that performs charging in accordance with the control signal 30 and receive power from the EV 10 that performs discharging in accordance with the control signal 30.

Each EV 10 autonomously controls charging-discharging based on the control signal 30. This eliminates the necessity of an aggregator for managing the charge-discharge power of each EV 10 and can reduce the cost of equipment.

When requesting permission for charging-discharging, the EV 10 does not require mutual communication with the external control device 20 and the authentication device 50, and therefore it is possible to reduce the cost for communication and cybersecurity.

The EV 10 transmits, as the permission request signal 40, the signal for proving that the control signal 30 has been received, which is set in advance with the authentication device 50. This enables the authentication device 50 to determine whether the EV 10 is following the control signal 30 from the external control device 20 by determining whether the received permission request signal 40 is the signal set in advance with the authentication device 50.

The EV 10 counts the time from when charging-discharging has started, and if the charge-discharge power amount of the EV 10 is less than the threshold charge-discharge power amount, the EV 10 transmits the permission request signal 40 each time the first threshold time has passed from when charging-discharging has started. The authentication device 50 counts the time from when charging-discharging has started, and when the first threshold time has passed, if the authentication device 50 determines that the permission request signal 40 has been received, the authentication device 50 continuously connects the power line for performing charging-discharging to the EV 10. Accordingly, the authentication device 50 can continuously confirm that the EV 10 is performing charging-discharging in accordance with the control signal 30, and after charging-discharging is permitted for the first time, if there is an EV 10 that is not following the control signal 30, the authentication device 50 can prevent charging-discharging of the EV 10 by interrupting the control signal 30.

Second Embodiment

[Configuration of Charge-Discharge Control System]

The configuration of a charge-discharge control system according to a second embodiment will be described with reference to FIG. 4.

The differences from the first embodiment are that an external control device 20 broadcasts a control signal 30 to a plurality of authentication devices 50 in addition to the plurality of EVs 10 that perform charging-discharging, that the authentication devices 50 receive the control signal 30, and part of the processing of an arithmetic operation unit 12 and an arithmetic operation unit 52. Therefore, only the different processing of the arithmetic operation unit 12 and the arithmetic operation unit 52 will be described, and descriptions of other common configurations will be omitted.

The arithmetic operation unit 12 outputs, as a permission request signal 40, the received control signal 30 or a signal obtained by editing the received control signal 30.

The arithmetic operation unit 52 determines whether the received permission request signal 40 is the control signal 30 received at the same time as the permission request signal 40 or the signal obtained by editing the control signal 30.

Figure 5A:
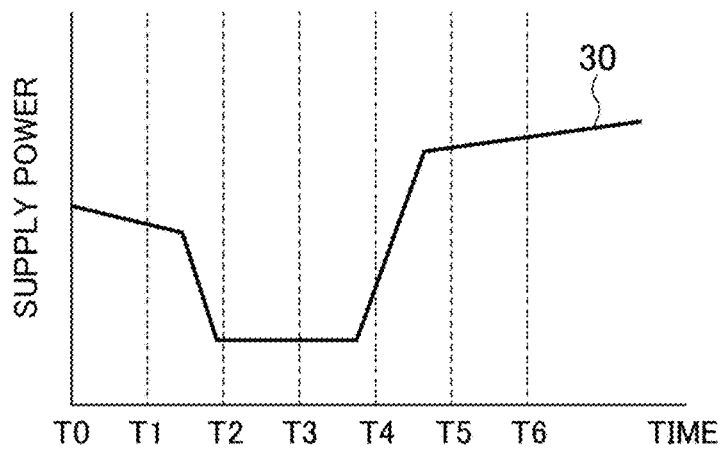
FIG. 5A is a diagram showing an example of a control signal to be broadcast.

The permission request signal 40 output by the arithmetic operation unit 12 will be described with reference to FIGS. 5A to 5C. FIG. 5A shows the control signal 30 transmitted from the external control device 20 in a time-sequential manner, and the external control device 20 transmits the total power usable by the plurality of EVs 10 that are performing charging-discharging at the current time.

Figure 5B:
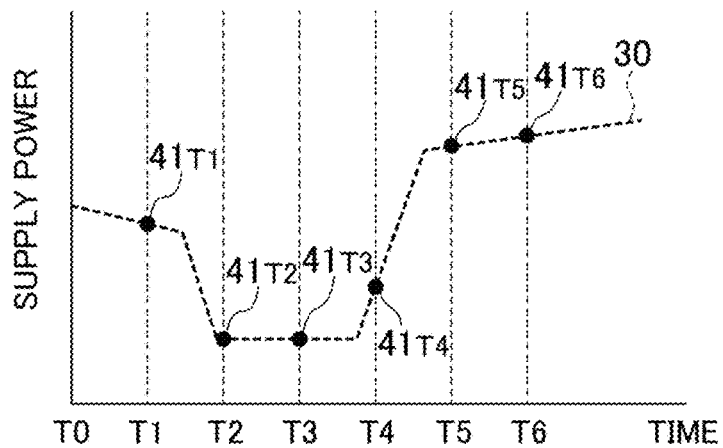
FIG. 5B is a graph (part 1) showing an example of a permission request signal in the charge-discharge control system according to the second embodiment.

FIG. 5B shows an example of a permission request signal 41 output by the arithmetic operation unit 12. If the current time is T6, the arithmetic operation unit 12 outputs 41T6 as the permission request signal 40, for example. The permission request signal 41T6 has the same value as the control signal 30 transmitted by the external control device 20 at time T6. All permission request signals 41T1 to 41T6 have the same value as the control signal 30 transmitted at time T1 to T6. In this way, the arithmetic operation unit 12 outputs the received control signal 30 as the permission request signal 41.

Figure 5C:
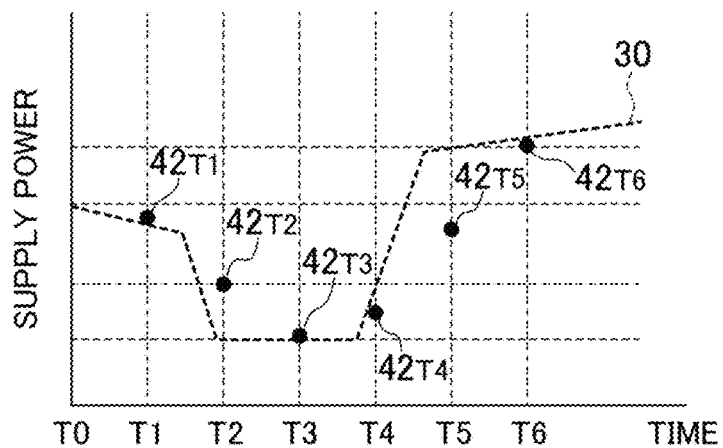
FIG. 5C is a graph (part 2) showing an example of the permission request signal in the charge-discharge control system according to the second embodiment.

FIG. 5C shows an example of a permission request signal 42 output by the arithmetic operation unit 12. If the current time is T6, the arithmetic operation unit 12 outputs 42T6 as the permission request signal, for example. The permission request signal 42T6 is the average value of the value of a control signal 30 transmitted from the external control device 20 at time T6 and the value of a control signal 30 transmitted at time T5, which is the previous transmission value of the control signal 30. Each of all permission request signals 42T1 to 42T6 is the average value of the value of the control signal 30 transmitted at each time and the previous transmission value of the control signal 30 transmitted at each time. In this way, the arithmetic operation unit 12 outputs the signal obtained by editing the control signal 30 as the permission request signal 41. The editing method of the control signal 30 is shared in advance between the arithmetic operation unit 12 and the arithmetic operation unit 52.

[Charge-Discharge Control Method]

Figure 6:
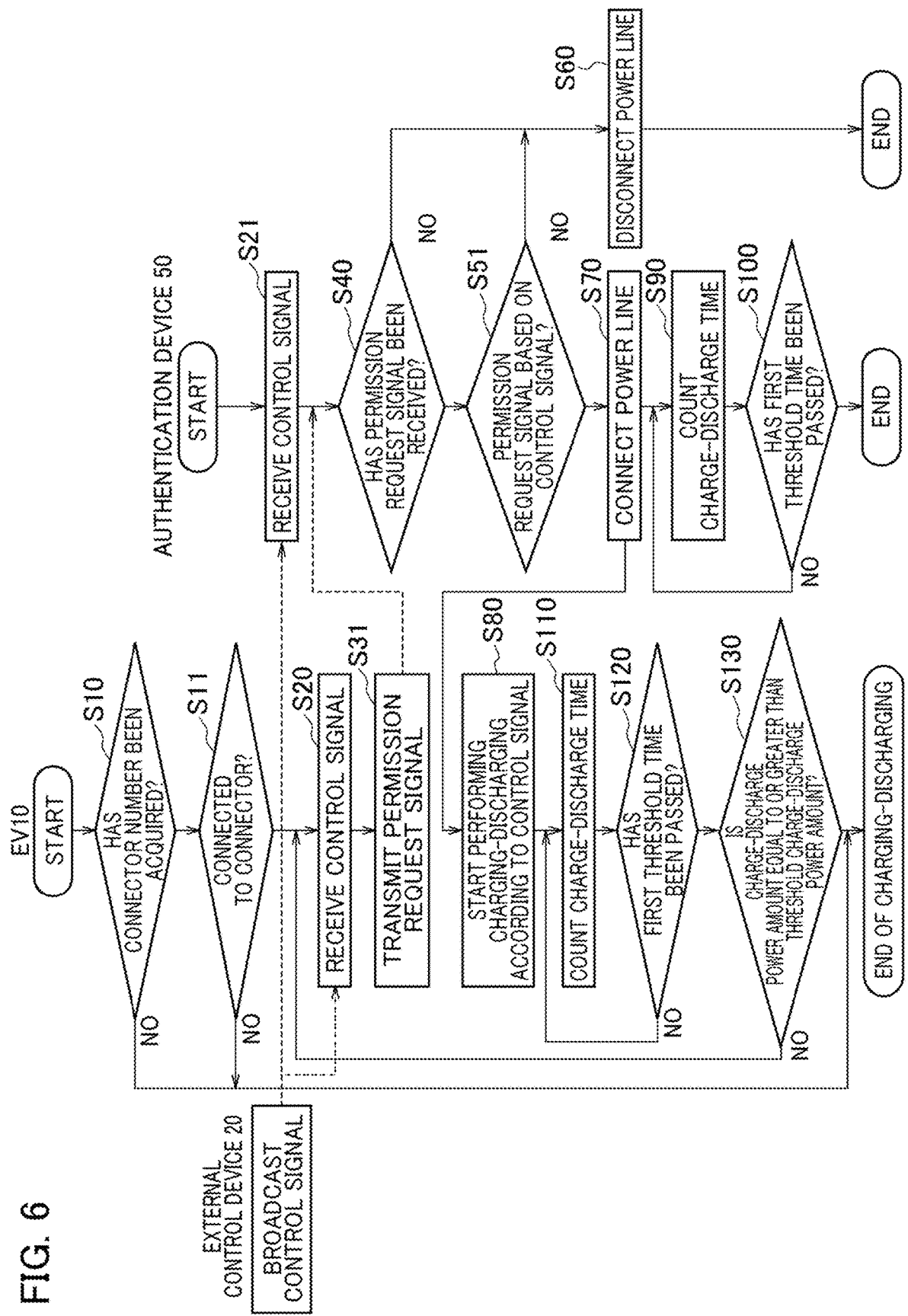
FIG. 6 is a flowchart showing the processing of the charge-discharge control system according to the second embodiment.

Next, the processing of the charge-discharge control system of FIG. 4 will be described with reference to FIG. 6. The difference from the first embodiment is that the processing of step S21 is further provided, and the processing of steps S31 and S51 is performed instead of the processing of steps S30 and S50. Therefore, only the difference will be described, and descriptions of other common processing will be omitted.

In step S21, the arithmetic operation unit 52 acquires the control signal 30 that has been received by the reception unit 51.

In step S31, the arithmetic operation unit 12 outputs, as the permission request signal 40, the received control signal 30 or the signal obtained by editing the received control signal 30.

In step S51, the arithmetic operation unit 52 determines whether the received permission request signal 40 is the control signal 30 received at the same time as the permission request signal 40 or the signal obtained by editing the control signal 30.

As described above, according to the second embodiment, the following operations and effects can be obtained in addition to the operations and effects of the first embodiment.

The external control device 20 broadcasts the control signal 30 to the plurality of authentication devices 50 in addition to the plurality of EVs 10 that perform charging-discharging, and the EV 10 transmits, to the authentication device 50, the received control signal 30 or the signal obtained by editing the received control signal 30 as the permission request signal 40. If the authentication device 50 receives the control signal 30 and the permission request signal 40 and determines that the permission request signal 40 is the control signal 30 received at the same time as the permission request signal 40 or the signal obtained by editing the control signal 30, the authentication device 50 connects the power line for performing charging-discharging to the EV 10. Accordingly, the authentication device 50 can determine whether the permission request signal 40 received from the EV 10 is a signal based on the control signal 30 received at the same time, and can determine whether the EV 10 is following the control signal 30 transmitted from the external control device 20. Therefore, the authentication device 50 can determine whether to permit the EV 10 to perform charging-discharging based on the result of the determination. Further, since the permission request signal 40 changes over time based on the control signal 30, falsification of the permission request signal 40 can be prevented.

Third Embodiment

[Configuration of Charge-Discharge Control System]

Figure 7:
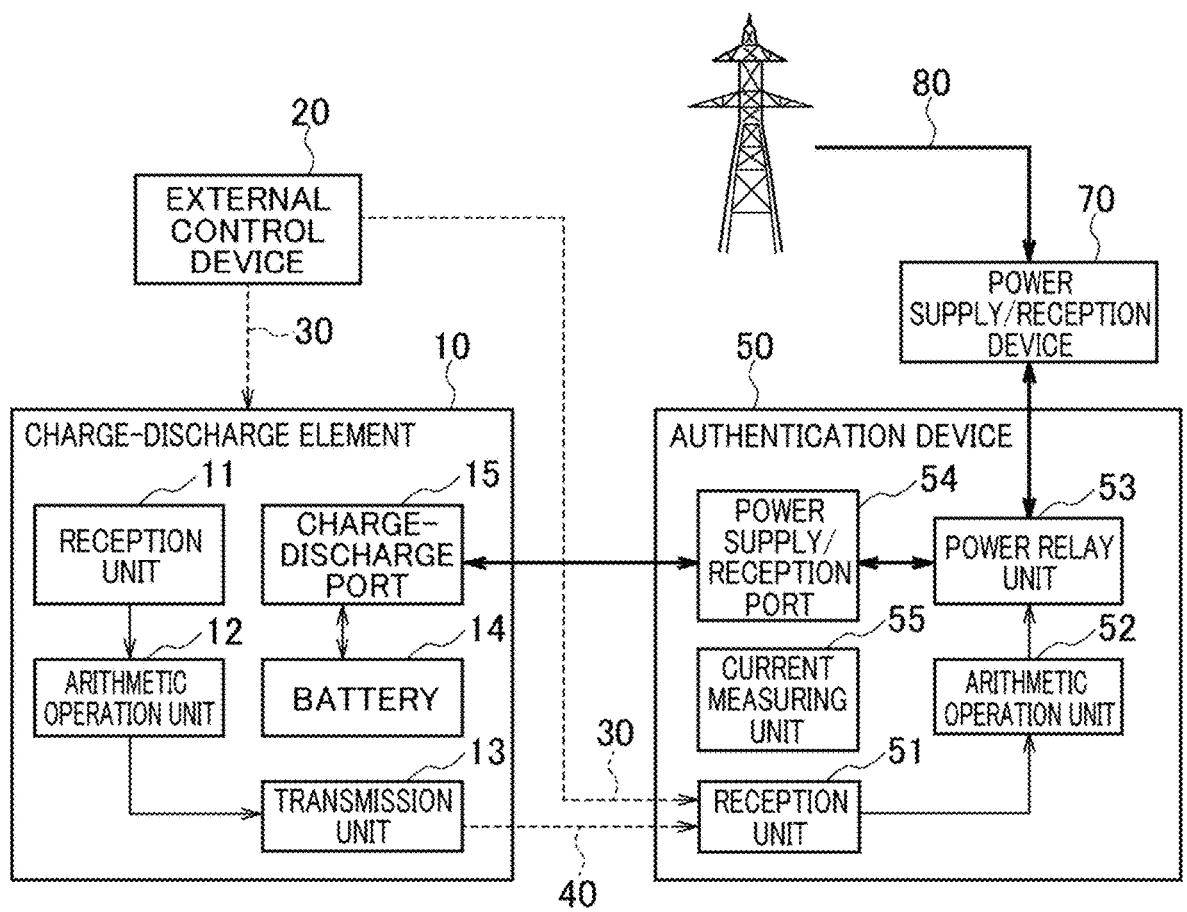
FIG. 7 is a block diagram showing the configuration of a charge-discharge control system according to a third embodiment.

The configuration of a charge-discharge control system according to a third embodiment will be described with reference to FIG. 7. The differences from the second embodiment are that the authentication device 50 further includes a current measuring unit 55, and part of the processing of the arithmetic operation unit 12 and the arithmetic operation unit 52. Therefore, only the differences will be described, and descriptions of other common configurations will be omitted.

The current measuring unit 55 is connected to a power supply/reception port 54 and measures a charge-discharge current value of the EV 10 by measuring a current value supplied to the EV 10 and a current value received from the EV 10.

The arithmetic operation unit 12 determines whether a charge-discharge current value of the EV 10 is equal to or greater than a threshold current value, and if the arithmetic operation unit 12 determines that the charge-discharge current value of the EV 10 is equal to or greater than the threshold current value, the arithmetic operation unit 12 outputs a permission request signal 40 for requesting permission for charging-discharging to the authentication device 50. The threshold current value is 70% of a current value that flows when the power supply/reception device 70 and the EV 10 generate the maximum power that can be supplied, for example.

The arithmetic operation unit 52 acquires the charge-discharge current value of the EV 10 measured by the current measuring unit 55, and if the charge-discharge current value of the EV 10 is equal to or greater than the threshold current value, the arithmetic operation unit 52 determines whether the permission request signal 40 has been received. If the arithmetic operation unit 52 determines that the permission request signal 40 has been received, the arithmetic operation unit 52 continuously connects the power line for performing charging-discharging to the EV 10. The threshold current value set for the arithmetic operation unit 52 is the same as the threshold current value set for the arithmetic operation unit 12.

[Charge-Discharge Control Method]

Figure 8A:
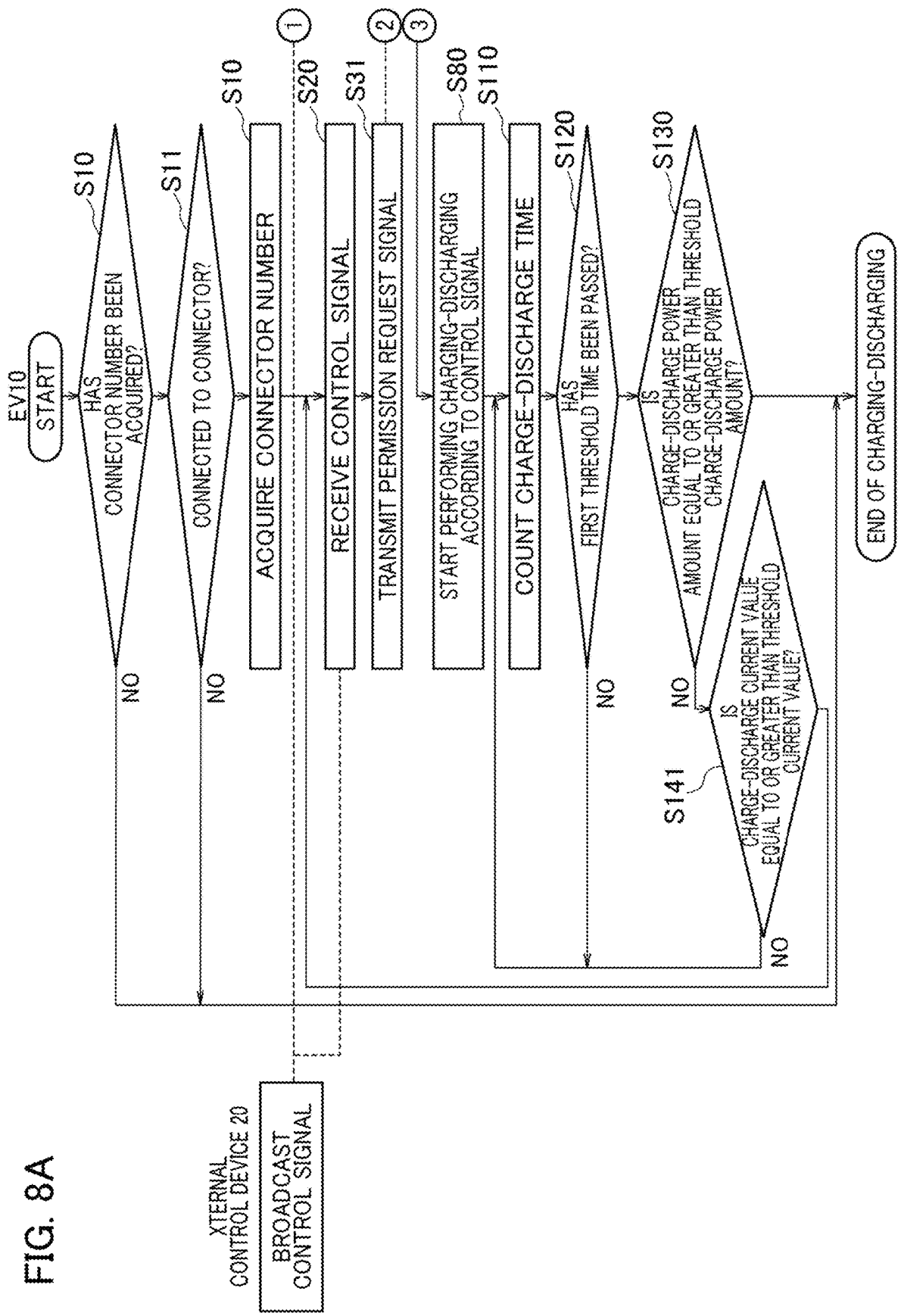
FIG. 8A is a flowchart (part 1) showing the processing of the charge-discharge control system according to the third embodiment.
Figure 8B:
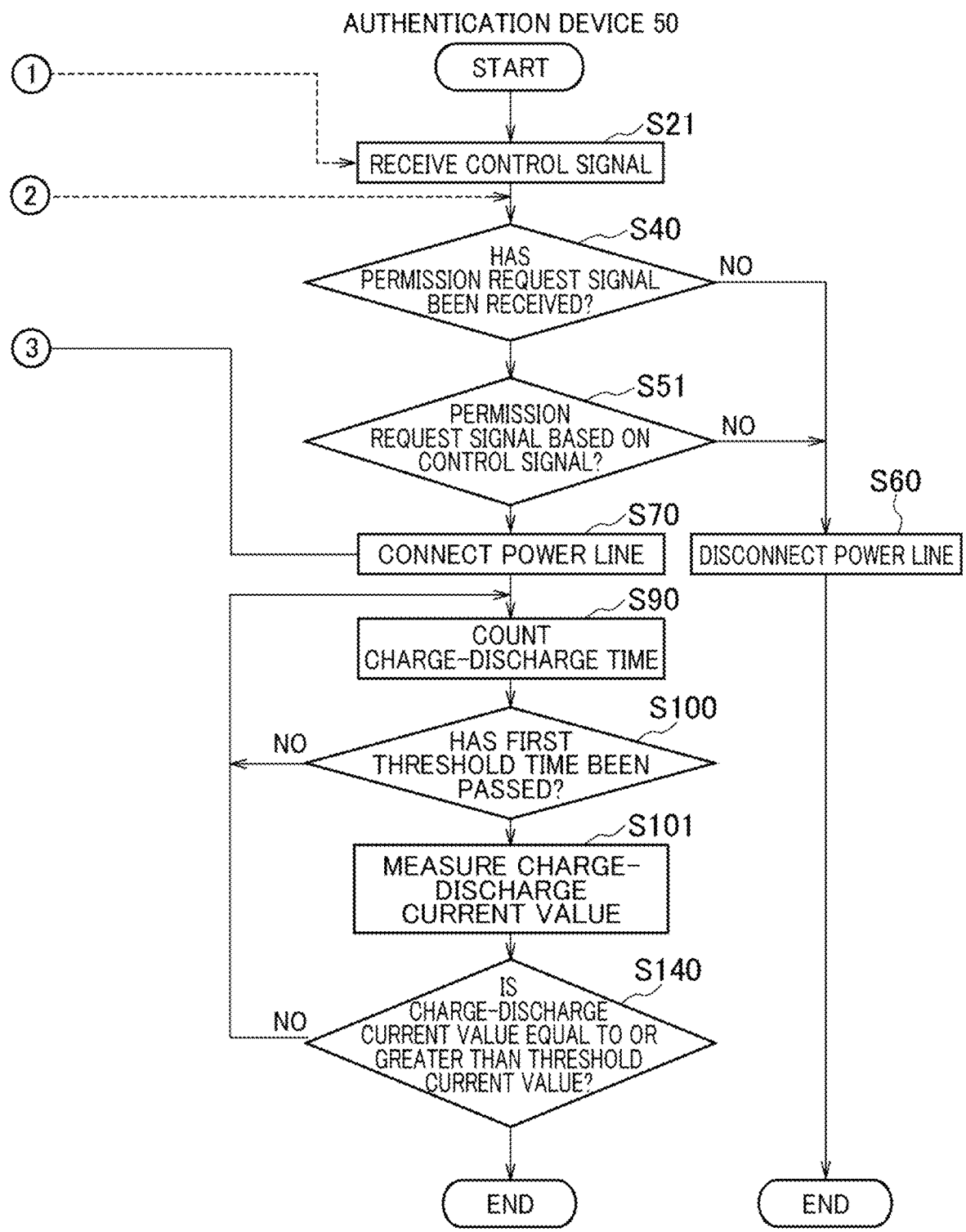
FIG. 8B is a flowchart (part 2) showing the processing of the charge-discharge control system according to the third embodiment.

Next, with reference to FIGS. 8A and 8B, the processing of the charge-discharge control system of FIG. 7 will be described. The difference from the second embodiment is that the processing of steps S101, S140, and S141 is further provided. Therefore, only the difference will be described, and descriptions of other common processing will be omitted.

In step S141, the arithmetic operation unit 12 determines whether the charge-discharge current value of the EV 10 is equal to or greater than the threshold current value. If the arithmetic operation unit 12 determines that the charge-discharge current value of the EV 10 is less than the threshold current value (NO in step S141), the processing returns to step S110, and the arithmetic operation unit 12 continues performing charging-discharging.

If the arithmetic operation unit 12 determines that the charge-discharge current value of the EV 10 is equal to or greater than the threshold current value in step S141 (YES in step S141), the processing returns to step S20. The arithmetic operation unit 12 can transmit the permission request signal 40 for continuously performing charging-discharging by performing the processing at step S20 and thereafter again.

In step S101, the current measuring unit 55 measures a charge-discharge current value of the EV 10 by measuring a current value supplied to the EV 10 and a current value received from the EV 10.

The processing proceeds to step S140, the arithmetic operation unit 52 acquires the charge-discharge current value of the EV 10 measured by the current measuring unit 55, and determines whether the charge-discharge current value of the EV 10 is equal to or greater than the threshold current value. If the arithmetic operation unit 52 determines that the charge-discharge current value of the EV 10 is less than the threshold current value (NO in step S140), the processing returns to step S90.

In step S140, if the arithmetic operation unit 52 determines that the charge-discharge current value of the EV 10 is equal to or greater than the threshold current value (YES in step S140), the processing ends, and the processing from step S21 is performed again. Accordingly, if the authentication device 50 receives the permission request signal 40, the authentication device 50 can continuously supply power to the EV 10 and receive power from the EV 10.

As described above, according to the third embodiment, the following operations and effects can be obtained in addition to the operations and effects of the second embodiment.

When a charge-discharge current value of a battery 14 is equal to or greater than the threshold current value, the EV 10 transmits the permission request signal 40. The authentication device 50 further includes a current measuring unit 55 for measuring the charge-discharge current value of the EV 10 by measuring a current value supplied to the EV 10 and a current value received from the EV 10, and determines whether the permission request signal 40 is received when the charge-discharge current value of the EV 10 is equal to or greater than the threshold current value. If the authentication device 50 determines that the permission request signal 40 has been received, the authentication device 50 continuously connects the power line for performing charging-discharging to the EV 10.

If there is an EV 10 that is performing charging-discharging with a current value which is equal to or greater than the threshold current value, there is a high possibility that the charge-discharge power of such an EV 10 is being limited by the control signal 30. Therefore, if the EV 10 is performing charging-discharging with a current value which is equal to or greater than the threshold current value, the authentication device 50 can determine whether the EV 10 is performing charging-discharging in accordance with the control signal 30 by determining whether the permission request signal 40 has been received from the EV 10. In addition, if there is an EV 10 that is performing charging-discharging with a current value which is less than the threshold current value, there is a low possibility that the charge-discharge power of such an EV 10 is being limited by the control signal 30. Therefore, the authentication device 50 does not determine whether the permission request signal 40 has been received from the EV 10 that is performing charging-discharging with a current value which is less than the threshold current value. This can reduce the communication cost of the EV 10 and the processing load of the authentication device 50.

Modified Example of Third Embodiment

[Configuration of Charge-Discharge Control System]

The configuration of a charge-discharge control system according to a modified example of the third embodiment will be described. The differences from the third embodiment are a control signal 30 transmitted by the external control device 20 and part of the processing of the arithmetic operation unit 52. Therefore, only the differences will be described, and descriptions of other common processing will be omitted.

The external control device 20 transmits the control signal 30 to stop the EV 10 from performing charging-discharging or to decrease the charge-discharge power of the EV 10 each time a second threshold time passes.

If the arithmetic operation unit 52 determines that the EV 10 stops performing charging-discharging in synchronization with the control signal 30 or decreases the charge-discharge power in synchronization with the control signal, the arithmetic operation unit 52 continuously connects a power line for performing charging-discharging to the EV 10. Specifically, the arithmetic operation unit 52 measures the charge-discharge current of the EV 10 and determines, from changes in the charge-discharge current, whether the EV 10 stops performing charging-discharging in synchronization with the control signal 30 or decreases the charge-discharge power in synchronization with the control signal 30.

Figure 9:
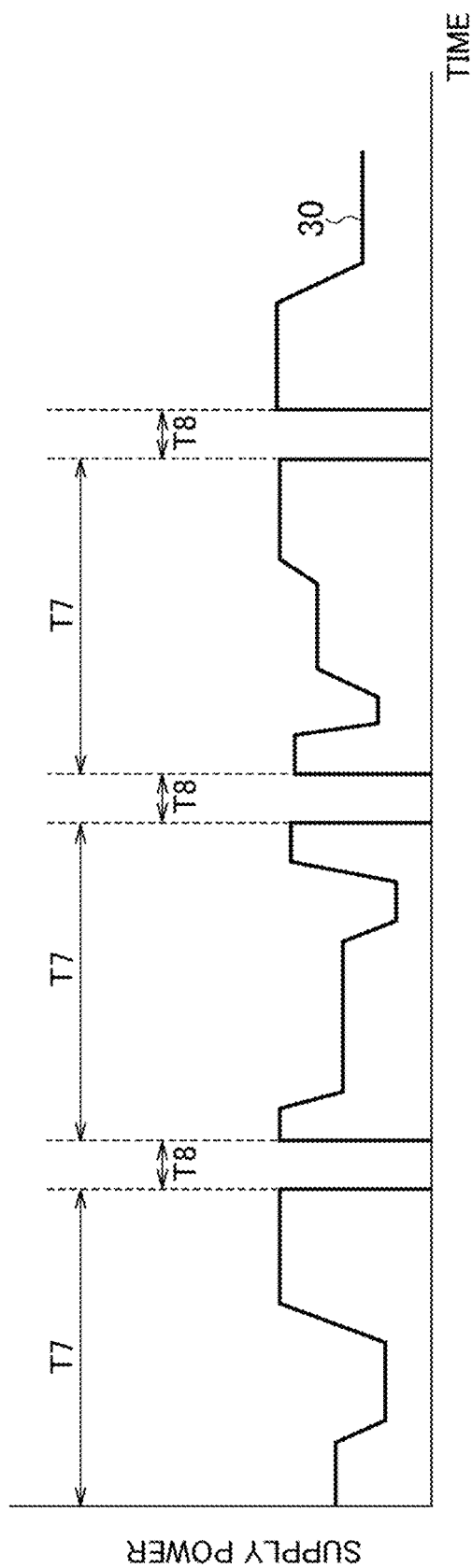
FIG. 9 is a diagram showing an example of a control signal in a charge-discharge control system according to a modified example of the third embodiment.

An example of the control signal 30 transmitted by the external control device 20 will be described with reference to FIG. 9. FIG. 9 shows the control signal 30 transmitted from the external control device 20 in a time-sequential manner. The external control device 20 transmits the total power usable by a plurality of EVs 10 that are performing charging-discharging at the current time, but each time a second threshold time T7 passes, the external control device 20 transmits, during a third threshold time T8, the control signal 30 to stop the EVs 10 from performing charging-discharging. The second threshold time is one hour, for example. The third threshold time is one minute, for example.

[Charge-Discharge Control Method]

Figure 10A:
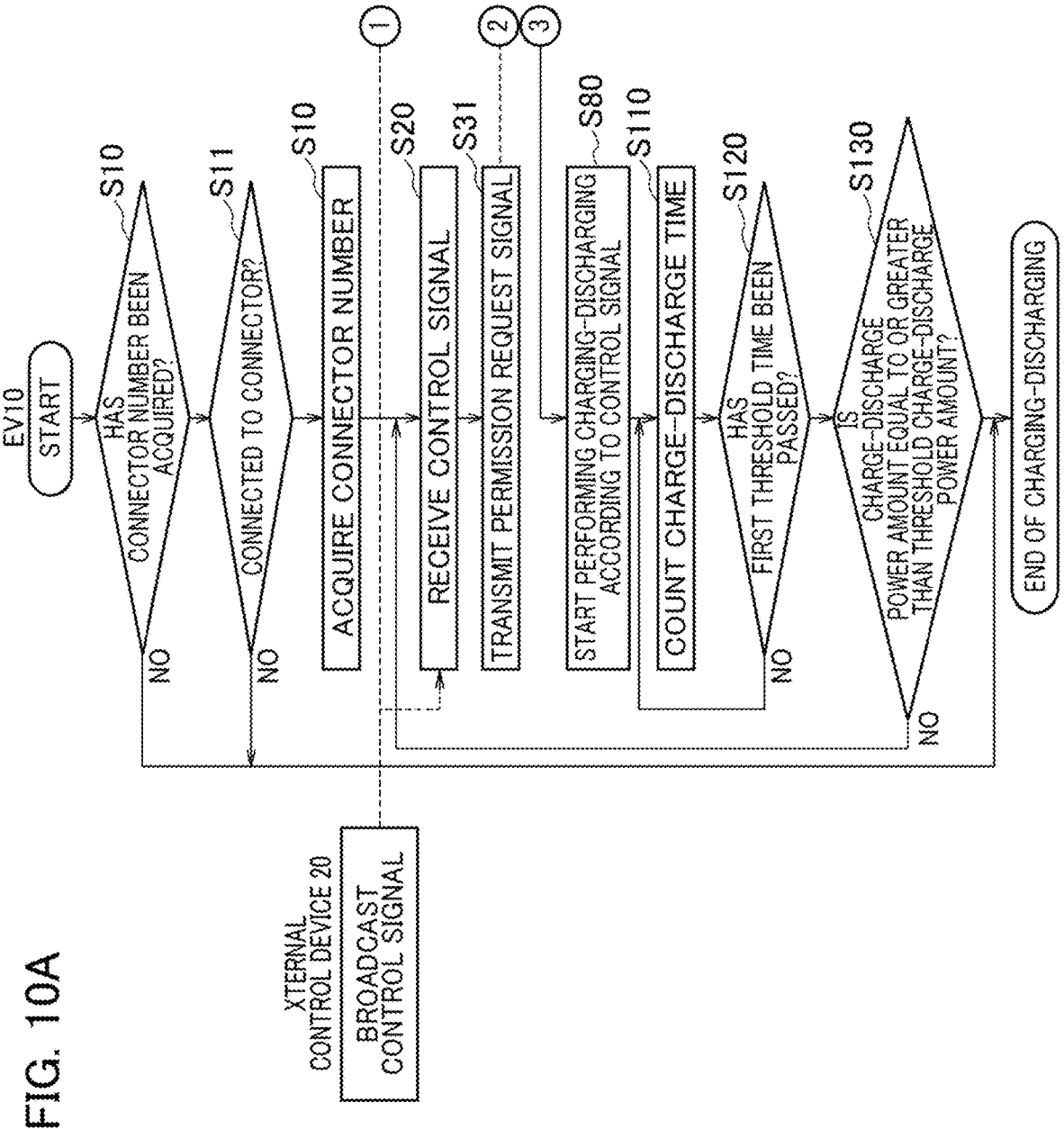
FIG. 10A is a flowchart (part 1) showing the processing of the charge-discharge control system according to the modified example of the third embodiment.
Figure 10B:
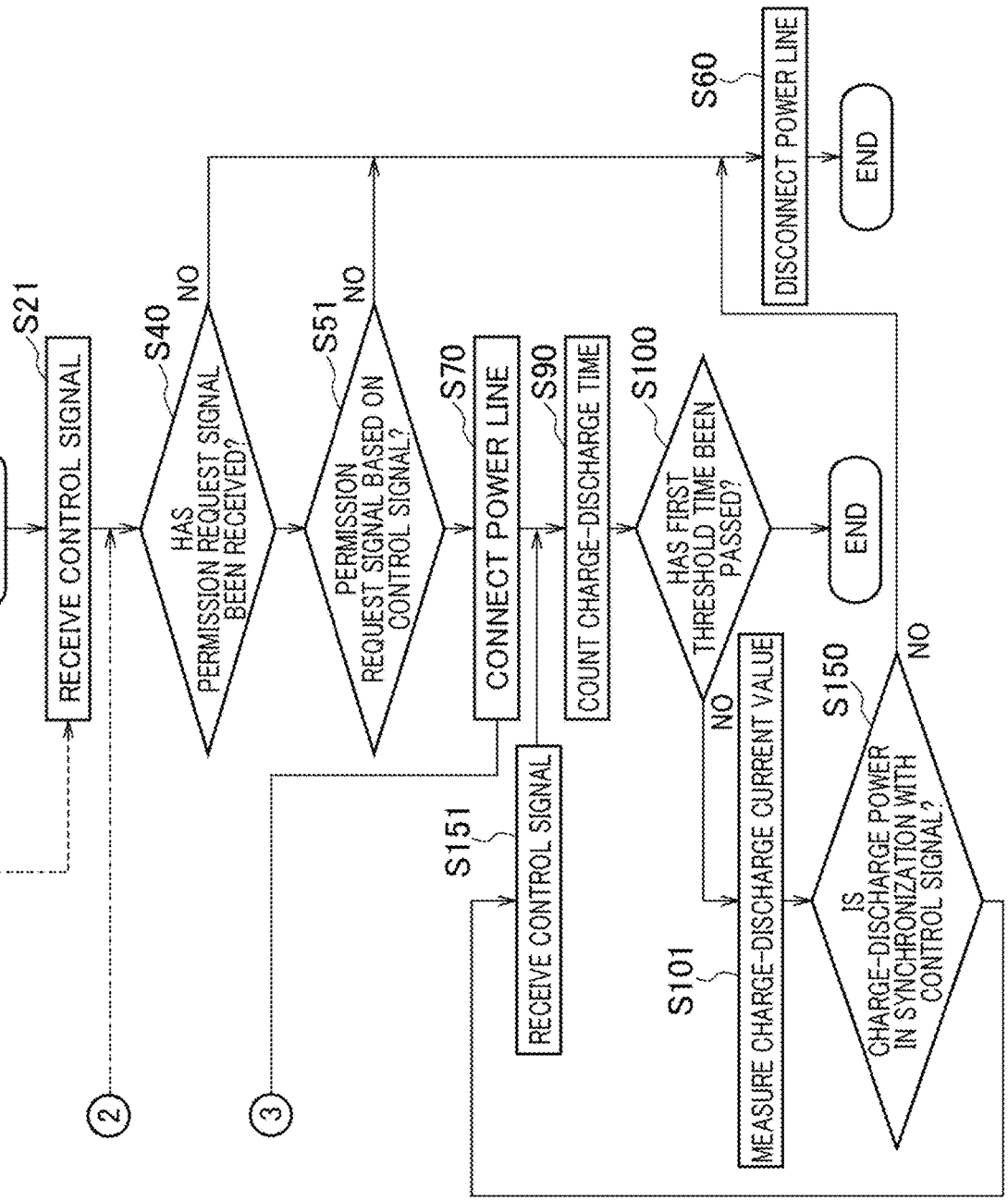
FIG. 10B is a flowchart (part 2) showing the processing of the charge-discharge control system according to the modified example of the third embodiment.

Next, with reference to FIGS. 10A and 10B, processing of the charge-discharge control system according to the modified example of the third embodiment will be described. The differences from the third embodiment are that the processing of step S141 is absent, that the processing of step S101 is performed if NO is determined in step S110, and that the processing of steps S150 and S151 is performed instead of the processing of step S140. Therefore, only the differences will be explained, and descriptions of other common processing will be omitted.

In step S150, the arithmetic operation unit 52 determines whether the EV 10 stops performing charging-discharging in synchronization with the control signal 30 or decreases the charge-discharge power in synchronization with the control signal 30. If the arithmetic operation unit 52 determines that the EV 10 does not stop performing charging-discharging in synchronization with the control signal 30 or does not decrease the charge-discharge power in synchronization with the control signal 30 (NO in step S150), the processing proceeds to step S60.

If the arithmetic operation unit 52 determines that the EV 10 stops performing charging-discharging in synchronization with the control signal 30 or decreases the charge-discharge power in synchronization with the control signal 30 in step S150 (YES in step S150), the processing proceeds to step S151.

In step S151, the arithmetic operation unit 52 acquires the control signal 30 received by a reception unit 51 and the processing returns to step S90.

As described above, according to the modified example of the third embodiment, the following operations and effects can be obtained in addition to the operations and effects of the third embodiment.

The external control device 20 transmits the control signal 30 to stop the EV 10 from performing charging-discharging or to decrease the charge-discharge power of the EV 10 each time the second threshold time passes. The authentication device 50 determines whether the EV 10 stops performing charging-discharging in synchronization with the control signal 30 or decreases the charge-discharge power in synchronization with the control signal 30. This enables the authentication device 50 to determine whether the EV 10 is performing charging-discharging in accordance with the control signal 30. Further, the authentication device 50 can determine whether to permit the EV 10 to perform charging-discharging with higher accuracy by performing double-determination for the control signal 30 and the permission request signal 40.

Although embodiments of the invention have been described as described above, the discussion and drawings forming part of this disclosure should not be construed as limiting the invention. Various alternative embodiments, examples, operational techniques will be apparent to those skilled in the art from this disclosure.

REFERENCE SIGNS LIST

10 Charge-discharge element (EV)
20 External control device
30 Control signal
40 Permission request signal
50 Authentication device
70 Power supply/reception device

The invention claimed is:

1. A charge-discharge control system in which a plurality of charge-discharge elements are configured to autonomously control charging-discharging, the charge-discharge control system comprising:
    an external control device configured to broadcast a control signal to the charge-discharge elements that perform charging-discharging; and
    an authentication device separate from the external control device and configured to permit charging-discharging of each of the charge-discharge elements, wherein
    the charge-discharge elements are configured to, having received the control signal, transmit, to the authentication device, a permission request signal for requesting permission for charging-discharging, which is based on the received control signal,
    the charge-discharge elements are not configured to perform mutual communication with the external control device and the authentication device,
    the authentication device is configured to
        having received the permission request signal, determine whether the permission request signal is a permission request signal based on the control signal received by the charge-discharge elements, and
        connect a power line for performing charging-discharging to the charge-discharge elements upon determining that the permission request signal is the permission request signal based on the control signal received by the charge-discharge elements, the authentication device is provided in plurality, and the external control device is configured to broadcast the control signal to the plurality of authentication devices and to the charge-discharge elements that perform charging-discharging, the charge-discharge elements transmit, to the plurality of authentication devices, the received control signal, or a signal obtained by editing the received control signal, as the permission request signal, and the plurality of authentication devices
receive the control signal and the permission request signal, and
upon determining that the permission request signal is the control signal received at the same time as the permission request signal or the signal obtained by editing the control signal, connect the power line for performing charging-discharging to the charge-discharge elements.

2. The charge-discharge control system according to claim 1, wherein
the charge-discharge elements transmit, as the permission request signal, a signal for proving that the control signal has been received, which is set in advance with the authentication device, and
when the authentication device determines that the received permission request signal is the signal set in advance with the authentication device, the authentication device connects the power line for performing charging-discharging to the charge-discharge elements.

3. The charge-discharge control system according to claim 1, wherein
the charge-discharge elements count a time from when charging-discharging has started, and responsive to a charge-discharge power amount of the charge-discharge elements being less than a threshold charge-discharge power amount, the charge-discharge elements transmit the permission request signal each time a first threshold time passes from when charging-discharging has started, and
the authentication device counts the time from when charging-discharging has started, and upon determining that the permission request signal has been received when the first threshold time has passed, the authentication device continuously connects the power line for performing charging-discharging to the charge-discharge elements.

4. A charge-discharge control system in which each of a plurality of charge-discharge elements are configured to autonomously control charging-discharging, the charge-discharge control system comprising:
an external control device configured to broadcast a control signal to the charge-discharge elements that perform charging-discharging; and
an authentication device configured to permit charging-discharging of each of the charge-discharge elements, wherein
the charge-discharge elements are configured to, having received the control signal, transmit, to the authentication device, a permission request signal for requesting permission for charging-discharging, which is based on the received control signal,
the authentication device is configured to
having received the permission request signal, determine whether the permission request signal is a permission request signal based on the control signal received by the charge-discharge elements, and
connect a power line for performing charging-discharging to the charge-discharge elements upon determining that the permission request signal is the permission request signal based on the control signal received by the charge-discharge elements, responsive to a charge-discharge current value of the charge-discharge elements being equal to or greater than a threshold current value, the charge-discharge elements transmit the permission request signal, the authentication device further includes a current measuring unit for measuring the charge-discharge current value of the charge-discharge elements by measuring a current value supplied to the charge-discharge elements and a current value received from the charge-discharge elements, responsive to the charge-discharge current value of the charge-discharge elements being equal to or greater than the threshold current value, the authentication device determines whether the permission request signal has been received, and upon determining that the permission request signal has been received, the authentication device continuously connects the power line for performing charging-discharging to the charge-discharge elements.

5. The charge-discharge control system according to claim 4, wherein
the external control device transmits the control signal to stop the charge-discharge elements from performing charging-discharging or to decrease charge-discharge power of the charge-discharge elements each time a second threshold time passes, and
the authentication device continuously connects the power line for performing charging-discharging to the charge-discharge elements, upon determining that the charge-discharge elements stop performing charging-discharging in synchronization with the control signal or decrease the charge-discharge power in synchronization with the control signal.

6. A charge-discharge control method in which a plurality of charge-discharge elements are configured to autonomously control charging-discharging, the charge-discharge control method comprising:
broadcasting a control signal to the charge-discharge elements that perform charging-discharging from an external control device;
transmitting a permission request signal for requesting permission for charging-discharging, which is based on the received control signal, to an authentication device from the charge-discharge elements having received the control signal, the authentication device being separate from the external control device;
upon receipt of the permission request signal by the authentication device, determining whether the permission request signal is a permission request signal based on the control signal received by the charge-discharge elements;
permitting charging-discharging of each of the charge-discharge elements by connecting a power line for performing charging-discharging to the charge-discharge elements, upon determining that the permission request signal is the permission request signal based on the control signal received by the charge-discharge elements;

providing the authentication device in plurality:
broadcasting the control signal from the external control device to the plurality of authentication devices in addition to the charge-discharge elements that perform charging-discharging;
transmitting, from the charge-discharge elements to the plurality of authentication devices, the received control signal, or a signal obtained by editing the received control signal, as the permission request signal;
receiving, by the plurality of authentication devices, the control signal and the permission request signal; and
upon determining, by the plurality of authentication devices, that the permission request signal is the control signal received at the same time as the permission request signal or the signal obtained by editing the control signal, connecting, by the plurality of authentication devices, the power line for performing charging-discharging to the charge-discharge elements,
wherein the charge-discharge elements are not configured to perform mutual communication with the external control device and the plurality of authentication devices.

* * * * *